US012793877B2

(12) United States Patent
Kawaguchi et al.

(10) Patent No.: US 12,793,877 B2
(45) Date of Patent: Nov. 10, 2026

(54) COIL DEVICE

(71) Applicant: SUMITOMO ELECTRIC INDUSTRIES, LTD., Osaka (JP)

(72) Inventors: Masafumi Kawaguchi, Osaka (JP); Shoichiro Sakai, Osaka (JP); Kou Noguchi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 907 days.

(21) Appl. No.: 17/914,493

(22) PCT Filed: Oct. 1, 2021

(86) PCT No.: PCT/JP2021/036417
§ 371 (c)(1),
(2) Date: Sep. 26, 2022

(87) PCT Pub. No.: WO2023/053442
PCT Pub. Date: Apr. 6, 2023

(65) Prior Publication Data
US 2024/0387091 A1 Nov. 21, 2024

(51) Int. Cl.
*H01F 27/28* (2006.01)
*H01F 17/00* (2006.01)

(52) U.S. Cl.
CPC ................................ *H01F 17/0013* (2013.01)

(58) Field of Classification Search
CPC ........ H01F 17/0013; H01F 5/00; H01F 17/00; H01F 17/04; H01F 27/28; H01F 38/14; H01F 41/04
USPC ........................................ 336/200, 232, 192
See application file for complete search history.

(56) References Cited

U.S. PATENT DOCUMENTS

2011/0102124 A1 5/2011 Matsushita
2013/0181799 A1* 7/2013 Deville .................. E21B 47/13 336/90
2015/0372495 A1* 12/2015 McCauley ............. H02J 50/70 307/104
2016/0012967 A1* 1/2016 Kurs ....................... H01F 38/14 336/182
2017/0135206 A1 5/2017 Ueda et al.
2018/0054900 A1 2/2018 Ueda et al.
2018/0226187 A1* 8/2018 Bien ....................... H02J 50/20
2018/0233967 A1* 8/2018 Peralta .................... H01F 38/14
2018/0247732 A1* 8/2018 Fujimori ............. H01B 7/0275
(Continued)

FOREIGN PATENT DOCUMENTS

JP H101-99454 A 4/1989
JP 2016-009854 A 1/2016
(Continued)

*Primary Examiner* — Shawki S Ismail
*Assistant Examiner* — Kazi S Hossain
(74) *Attorney, Agent, or Firm* — Oliff PLC

(57) ABSTRACT

This coil device includes at least one printed wiring board. The at least one printed wiring board includes a base film having a first main surface and a second main surface, and a first conductive pattern constituted by a first wiring section spirally wound on the first main surface. An average distance between adjacent first wiring sections is greater than or equal to 3 μm and less than or equal to 15 μm. The length of the first wiring section is greater than or equal to 150 mm and less than or equal to 1000 mm.

11 Claims, 11 Drawing Sheets

(56) References Cited

U.S. PATENT DOCUMENTS

| | | | | |
|---|---|---|---|---|
| 2019/0311830 | A1* | 10/2019 | Kim | H01F 27/324 |
| 2020/0022262 | A1 | 1/2020 | Okamoto et al. | |
| 2020/0185142 | A1* | 6/2020 | Kim | H01F 17/0013 |
| 2021/0005365 | A1 | 1/2021 | Jung et al. | |
| 2021/0329795 | A1* | 10/2021 | Ueda | H05K 3/4626 |
| 2022/0076873 | A1* | 3/2022 | Hirukawa | H01F 17/0013 |

FOREIGN PATENT DOCUMENTS

| | | | |
|---|---|---|---|
| JP | 2021-13004 | A | 2/2021 |
| WO | 2010/007858 | A1 | 1/2010 |
| WO | 2015/199116 | A1 | 12/2015 |
| WO | 2016/147993 | A1 | 9/2016 |
| WO | 2018/211733 | A1 | 11/2018 |

* cited by examiner

COIL DEVICE

TECHNICAL FIELD

The present disclosure relates to a coil device.

BACKGROUND ART

For example, Japanese Patent Laying-Open No. 2016-9854 (Patent Literature 1) describes a coil device. The coil device described in Patent Literature 1 includes a printed wiring board. The printed wiring board includes a base film and a conductive pattern. The conductive pattern is spirally wound on the main surface of the base film and constitutes a coil.

In addition, WO 2018/211733 A (Patent Literature 2) describes a printed wiring board. The printed wiring board described in Patent Literature 2 includes a base film and a conductive pattern. The conductive pattern is disposed on the main surface of the base film and constitutes a coil.

CITATION LIST

Patent Literature

PTL 1: Japanese Patent Laying-Open No. 2016-9854
PTL 2: WO 2018/211733 A

SUMMARY OF INVENTION

A coil device according to the present disclosure includes at least one printed wiring board. The at least one printed wiring board includes a base film having a first main surface and a second main surface, and a first conductive pattern constituted by a first wiring section spirally wound on the first main surface. An average distance between adjacent first wiring sections is greater than or equal to 3 μm and less than or equal to 15 μm. The length of the first wiring section is greater than or equal to 150 mm and less than or equal to 1000 mm.

DETAILED DESCRIPTION

Figure 1:
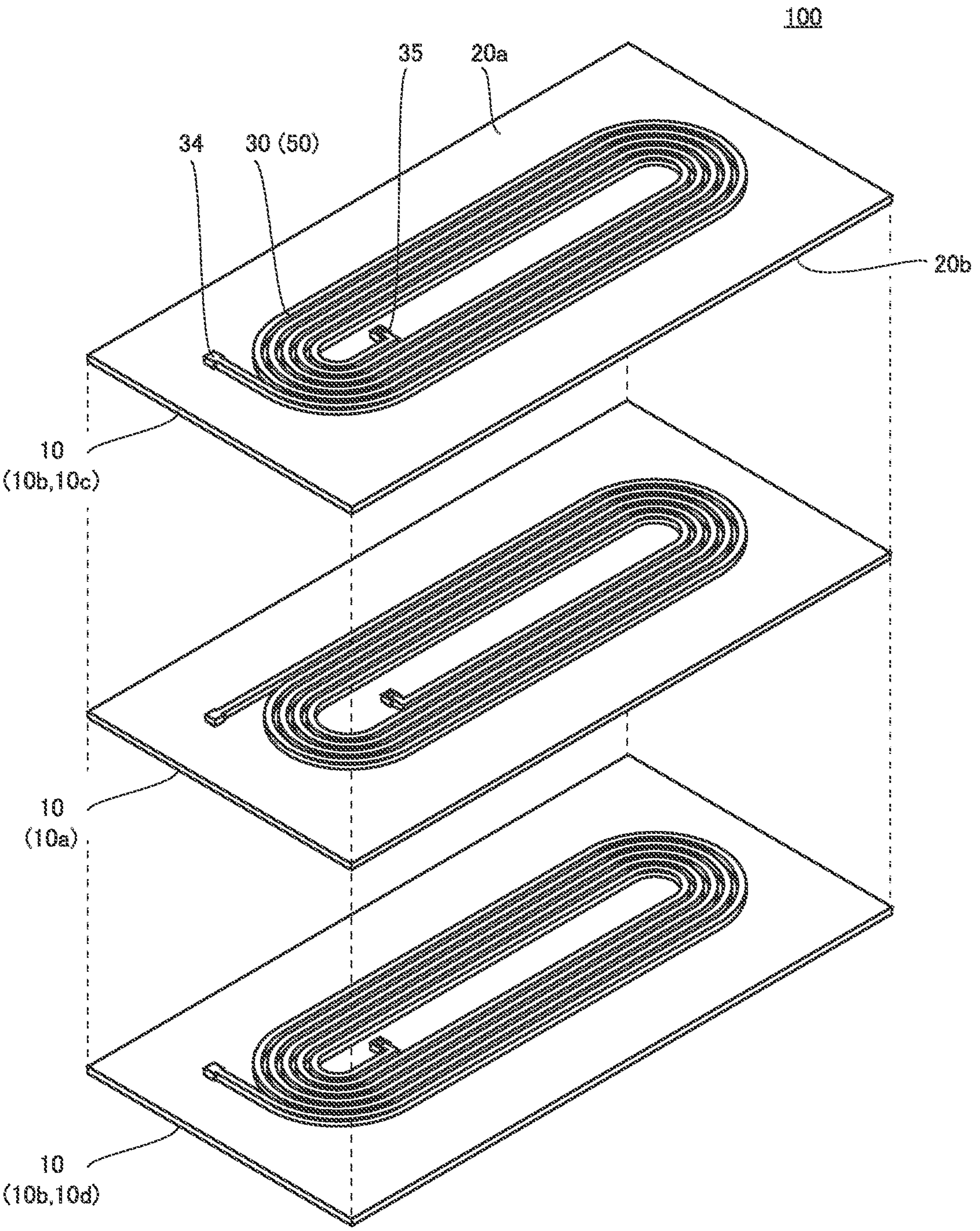
FIG. 1 is an exploded perspective view of a coil device 100.

Problem to be Solved by the Present Disclosure

The coil device described in Patent Literature 1 and the printed wiring board described in Patent Literature 2 have room for improvement in downsizing the coil while increasing the number of turns of the wiring section constituting the coil.

The present disclosure has been accomplished in view of the above-described problems of the prior art. More specifically, the present disclosure provides a coil device capable of downsizing a coil while increasing the number of turns of a wiring section constituting the coil.

Advantageous Effect of the Present Disclosure

According to the coil device of the present disclosure, it is possible to downsize the coil while increasing the number of turns of the wiring section constituting the coil.

Description of Embodiments

First, embodiments of the present disclosure will be listed and described.

(1) A coil device according to one embodiment of the present disclosure includes at least one printed wiring board. The at least one printed wiring board includes a base film having a first main surface and a second main surface, and a first conductive pattern constituted by a first wiring section spirally wound on the first main surface. An average distance between adjacent first wiring sections is greater than or equal to 3 μm and less than or equal to 15 μm. The length of the first wiring section is greater than or equal to 150 mm and less than or equal to 1000 mm.

According to the coil device described in (1), it is possible to downsize a coil while increasing the number of turns of the wiring section constituting the coil.

(2) In the coil device according to (1), the at least one printed wiring board may further include a second conductive pattern constituted by a second wiring section spirally wound on the second main surface. The second wiring section may have a length greater than or equal to 150 mm and less than or equal to 1000 mm.

(3) In the coil device according to (1) or (2), the first wiring section may include a seed layer disposed on the first main surface, a first electrolytic plating layer disposed on the seed layer, and a second electrolytic plating layer covering the seed layer and the first electrolytic plating layer.

(4) In the coil device according to (3), the seed layer may include a sputtered layer disposed on the first main surface and an electroless plating layer disposed on the sputtered layer. The sputtered layer may be formed of a material different from a material of the first electrolytic plating layer. The electroless plating layer may be formed of a material same as the material of the first electrolytic plating layer.

(5) In the coil device according to (3), the seed layer may be a single layer formed of a material same as the material of the first electrolytic plating layer.

(6) In the coil device according to (5), the single layer may be a sputtered layer.

(7) In the coil devices according to (1) to (6), a value obtained by dividing a height of the first wiring section by a width of the first wiring section may be greater than or equal to 0.15 and less than or equal to 5.

(8) In the coil devices according to (1) to (7), in plan view, the first conductive pattern may have a width less than or equal to 10 mm and a length less than or equal to 15 mm.

(9) In the coil devices according to (1) to (8), a value obtained by dividing a height of the first wiring section by an average distance between the first wiring sections adjacent to each other may be greater than or equal to 2 and less than or equal to 25.

(10) In the coil device according to (1), the at least one printed wiring board includes a plurality of printed wiring boards disposed to be overlapped in a thickness direction of the base film.

(11) In the coil device according to (10), at least one of the plurality of printed wiring boards may further include a second conductive pattern constituted by a second wiring section spirally wound on the second main surface. The second wiring section may have a length greater than or equal to 150 mm and less than or equal to 1000 mm.

(12) In the coil devices according to (1) to (9), the at least one printed wiring board may include a plurality of printed wiring boards disposed to be overlapped in a thickness direction of the base film. Each of the plurality of printed wiring boards may further include a second conductive pattern constituted by a second wiring section that is wound on the second main surface and that is electrically connected to the first wiring section. An average distance between the second wiring sections adjacent to each other may be greater than or equal to 3 μm and less than or equal to 15 μm. The first wiring section of a first printed wiring board that is one of the plurality of printed wiring boards may be electrically connected to the second wiring section of a second printed wiring board that is another one of the plurality of printed wiring boards adjacent to the first printed wiring board in the thickness direction of the base film. The sum of the length of the first wiring section and the length of the second wiring section in the plurality of printed wiring boards may be greater than or equal to 300 mm and less than or equal to 2000 mm.

(13) A coil device according to another embodiment of the present disclosure includes a plurality of printed wiring boards. Each of the plurality of printed wiring boards includes a base film that has a first main surface and a second main surface, a first conductive pattern that is constituted by a first wiring section wound on the first main surface, and a second conductive pattern that is constituted by a second wiring section spirally wound on the second main surface and electrically connected to the first wiring section. The plurality of printed wiring boards is disposed to be overlapped in a thickness direction of the base film. The first wiring section of a first printed wiring board that is one of the plurality of printed wiring boards may be electrically connected to the second wiring section of a second printed wiring board that is another one of the plurality of printed wiring boards adjacent to the first printed wiring board in the thickness direction of the base film. An average distance between the first wiring sections adjacent to each other and an average distance between the second wiring sections adjacent to each other are greater than or equal to 3 μm and less than or equal to 15 μm. The sum of the length of the first wiring section and the length of the second wiring section in the plurality of printed wiring boards is greater than or equal to 300 mm and less than or equal to 2000 mm.

According to the coil device described in (13), it is possible to downsize a coil while increasing the number of turns of the wiring section constituting the coil.

Detailed Description of Embodiments

An embodiment of the present disclosure will now be described in detail with reference to the drawings. In the following drawings, the same or corresponding parts are denoted by the same reference numerals, and redundant description will not be repeated.

(Configuration of Coil Device According to Embodiment)

A configuration of a coil device (hereinafter referred to as "coil device 100") according to the embodiment will be described.

FIG. 1 is an exploded perspective view of coil device 100. As illustrated in FIG. 1, coil device 100 includes a plurality of printed wiring boards 10. In the example of FIG. 1, coil device 100 includes three printed wiring boards 10. However, coil device 100 may include only one printed wiring board 10.

Figure 2:
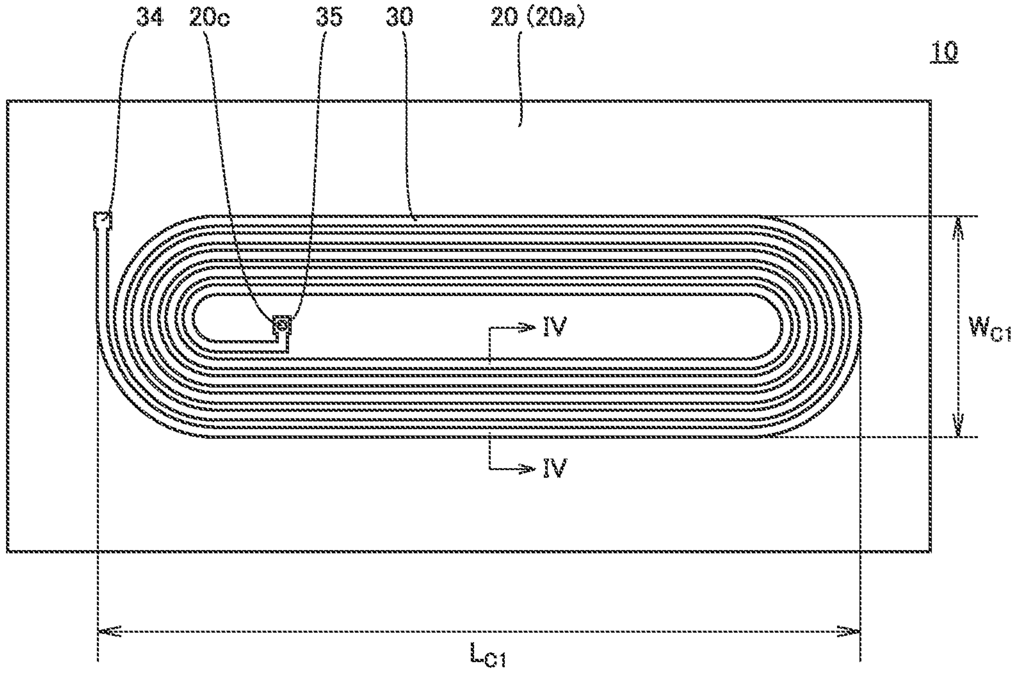
FIG. 2 is a plan view of a printed wiring board 10.
Figure 3:
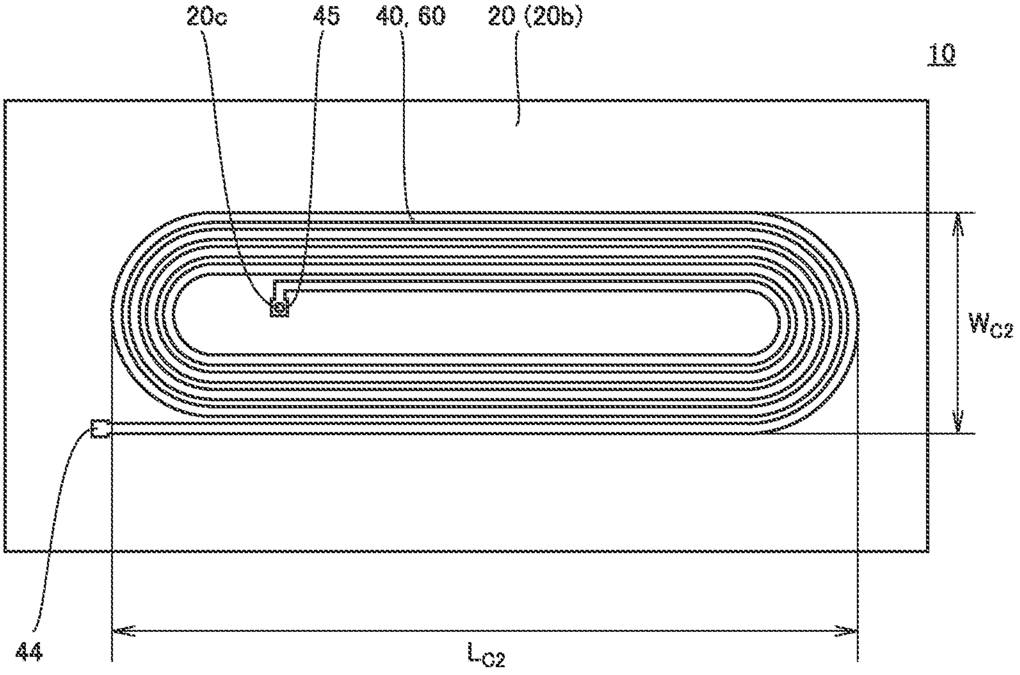
FIG. 3 is a bottom view of printed wiring board 10.
Figure 4:
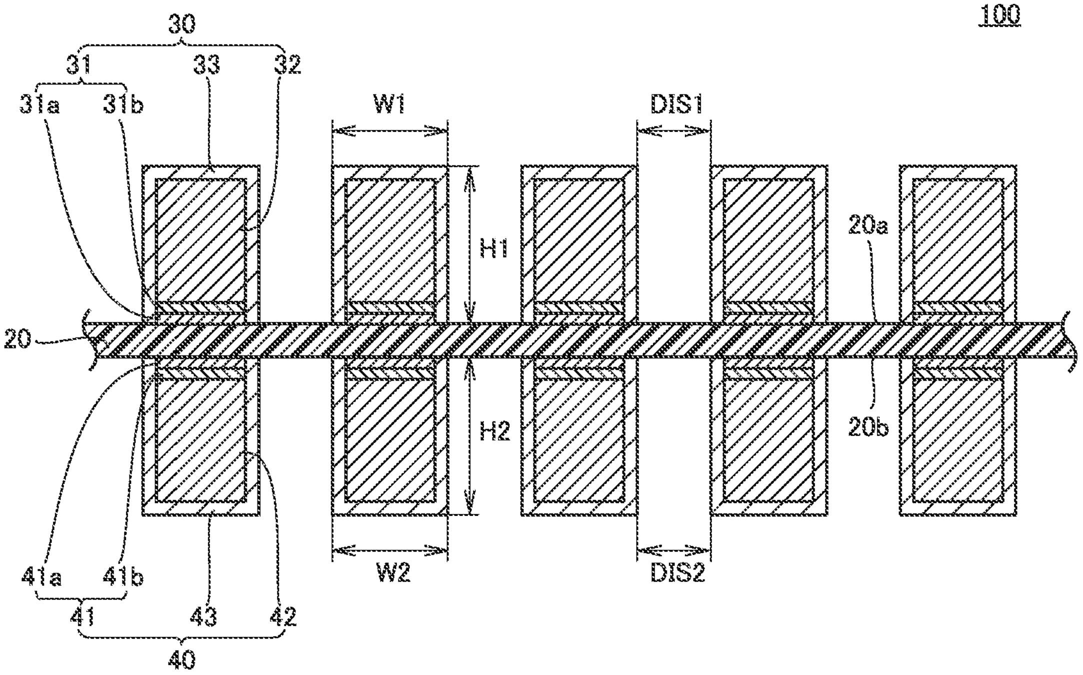
FIG. 4 is a cross-sectional view taken along line IV-IV in FIG. 2.

FIG. 2 is a plan view of printed wiring board 10. FIG. 3 is a bottom view of printed wiring board 10. FIG. 4 is a cross-sectional view taken along line IV-IV in FIG. 2. As illustrated in FIGS. 2, 3, and 4, printed wiring board 10 includes base film 20, a first wiring section 30, and a second wiring section 40.

Base film 20 has a first main surface **20*a* and a second main surface 20*b*. Second main surface 20*b* is a surface reverse to first main surface 20*a*. A direction from first main surface 20*a* toward second main surface 20*b* may be referred to as a thickness direction of base film 20. Base film 20 is formed of a flexible insulating material. That is, printed wiring board 10 is a flexible printed wiring board. Specific examples of the material constituting base film 20** include polyimide, polyethylene terephthalate, and fluororesin.

First wiring section 30 is disposed on first main surface **20*a*. First wiring section 30 is spirally wound in plan view (as viewed in a direction orthogonal to first main surface 20*a*). First wiring section 30 spirally wound in plan view constitutes a first conductive pattern 50 functioning as a coil. The outer shape of first conductive pattern 50** is, for example, oval in plan view.

The width and the length of first conductive pattern 50 in plan view are defined as a width $W_{C1}$ and a length $L_{C1}$, respectively. Length $L_{C1}$ is larger than width $W_{C1}$. Width $W_{C1}$ and length $L_{C1}$ are, for example, less than or equal to 10 mm and less than or equal to 15 mm, respectively. Width $W_{C1}$ and length $L_{C1}$ are, for example, greater than or equal to 1 mm.

An average distance between adjacent first wiring sections 30 is defined as a distance DIS1. Distance DIS1 is greater than or equal to 3 μm and less than or equal to 15 μm. The height of first wiring section 30 is defined as a height H1. Height H1 is, for example, greater than or equal to 15 μm and less than or equal to 75 μm. The width of first wiring section 30 is defined as a width W1. Width W1 is, for example, greater than or equal to 15 μm and less than or equal to 100 μm. The aspect ratio of first wiring section 30 is a value obtained by dividing height H1 by width W1. The aspect ratio of first wiring section 30 is, for example, greater than or equal to 0.15 and less than or equal to 5. A value obtained by dividing height H1 by distance DIS1 is, for example, greater than or equal to 2 and less than or equal to 25. The value obtained by dividing height H1 by distance DIS1 is preferably greater than or equal to 3 and less than or equal to 20. The value obtained by dividing height H1 by distance DIS1 is more preferably greater than or equal to 4 and less than or equal to 20.

Distance DIS1 is measured by the following method. First, ten measurement points are set at equal intervals between one end and the other end of first wiring section 30 wound in a spiral shape. Secondly, the distance between first wiring sections 30 adjacent to each other at each measurement point is measured at the central portion in the height direction of first wiring section 30, and the sum of the measured values is calculated. Thirdly, the sum is divided by 10, whereby distance DIS1 is obtained.

First wiring section 30 includes a seed layer 31, a first electrolytic plating layer 32, and a second electrolytic plating layer 33. Seed layer 31 is disposed on first main surface 20*a*. First electrolytic plating layer 32 is disposed on seed layer 31. Second electrolytic plating layer 33 covers seed layer 31 and first electrolytic plating layer 32. That is, second electrolytic plating layer 33 is disposed on the side surfaces of seed layer 31 and first electrolytic plating layer 32 and on the upper surface of first electrolytic plating layer 32.

Seed layer 31 includes, for example, a first layer 31*a* and a second layer 31*b*. First layer 31*a* is disposed on first main surface 20*a*. First layer 31*a* is, for example, a sputtered layer (layer formed by sputtering). First layer 31*a* is formed of, for example, a nickel-chromium alloy. Second layer 31*b* is disposed on first layer 31*a*. Second layer 31*b* is, for example, an electroless plating layer (a layer formed by electroless plating). Second layer 31*b* is formed of, for example, copper.

First electrolytic plating layer 32 is a layer formed by electrolytic plating. First electrolytic plating layer 32 is made of copper, for example. That is, first layer 31*a* is formed of a material different from that of first electrolytic plating layer 32, and second layer 31*b* is formed of the same material as that of first electrolytic plating layer 32. Second electrolytic plating layer 33 is a layer formed by electrolytic plating. Second electrolytic plating layer 33 is made of copper, for example.

First layer 31*a* and second layer 31*b* may be formed of, for example, copper. That is, seed layer 31 may be formed of the same material as first electrolytic plating layer 32. In this case, first layer 31*a* may be a nano copper layer formed by sputtering. Seed layer 31 may not have second layer 31*b*. That is, seed layer 31 may be a single layer formed of the same material as first electrolytic plating layer 32.

Second wiring section 40 is disposed on second main surface 20*b*. Second wiring section 40 is spirally wound in plan view (as viewed in a direction orthogonal to second main surface 20*b*). Second wiring section 40 spirally wound in plan view constitutes a second conductive pattern 60 functioning as a coil. The outer shape of second conductive pattern 60 is, for example, oval in plan view.

The width and the length of second conductive pattern 60 in plan view are defined as a width $W_{C2}$ and a length $L_{C2}$, respectively. Length $L_{C2}$ is larger than width $W_{C2}$. Width $W_{C2}$ and length $L_{C2}$ are, for example, less than or equal to 10 mm and less than or equal to 15 mm, respectively. Width $W_{C2}$ and length $L_{C2}$ are, for example, greater than or equal to 1 mm.

An average distance between adjacent second wiring sections 40 is defined as a distance DIS2. Distance DIS2 is greater than or equal to 3 μm and less than or equal to 15 μm. The height of second wiring section 40 is defined as a height H2. Height H2 is, for example, greater than or equal to 15 μm and less than or equal to 75 μm. The width of second wiring section 40 is defined as a width W2. Width W2 is, for example, greater than or equal to 15 μm and less than or equal to 100 μm. The aspect ratio of second wiring section 40 is a value obtained by dividing height H2 by width W2. The aspect ratio of second wiring section 40 is, for example, greater than or equal to 0.15 and less than or equal to 5. A value obtained by dividing height H2 by distance DIS2 is, for example, greater than or equal to 2 and less than or equal to 25. The value obtained by dividing height H2 by distance DIS2 is preferably greater than or equal to 3 and less than or equal to 20. The value obtained by dividing height H2 by distance DIS2 is more preferably greater than or equal to 4 and less than or equal to 20.

Distance DIS2 is measured by the following method. First, ten measurement points are set at equal intervals between one end and the other end of second wiring section 40 wound in a spiral shape. Secondly, the distance between second wiring sections 40 adjacent to each other at each measurement point is measured at the central portion in the height direction of second wiring section 40, and the sum of the measured values is calculated. Thirdly, the sum is divided by 10, whereby distance DIS2 is obtained.

Second wiring section 40 includes a seed layer 41, a first electrolytic plating layer 42, and a second electrolytic plating layer 43. Seed layer 41 is disposed on second main surface 20*b*. First electrolytic plating layer 42 is disposed on seed layer 41. Second electrolytic plating layer 43 covers seed layer 41 and first electrolytic plating layer 42. That is, second electrolytic plating layer 43 is disposed on the side surfaces of seed layer 41 and first electrolytic plating layer 42 and on the upper surface of first electrolytic plating layer 42.

Seed layer 41 includes, for example, a first layer 41*a* and a second layer 41*b*. First layer 41*a* is disposed on second main surface 20*b*. First layer 41*a* is, for example, a sputtered layer. First layer 41*a* is formed of, for example, a nickel-chromium alloy. Second layer 41*b* is disposed on first layer 41*a*. Second layer 41*b* is, for example, an electroless plating layer. Second layer 41*b* is formed of, for example, copper.

First electrolytic plating layer 42 is a layer formed by electrolytic plating. First electrolytic plating layer 42 is made of copper, for example. That is, first layer 41*a* is formed of a material different from that of first electrolytic plating layer 42, and second layer 41*b* is formed of the same material as that of first electrolytic plating layer 42. Second electrolytic plating layer 43 is a layer formed by electrolytic plating. Second electrolytic plating layer 43 is made of copper, for example.

First layer 41*a* and second layer 41*b* may be formed of, for example, copper. That is, seed layer 41 may be formed of the same material as first electrolytic plating layer 42. In this case, first layer 41*a* may be a nano copper layer formed by sputtering. Seed layer 41 may not have second layer 41*b*. That is, seed layer 41 may be a single layer formed of the same material as first electrolytic plating layer 42.

First wiring section 30 has a first end portion 34 and a second end portion 35. First end portion 34 and second end portion 35 are located at both ends of first wiring section 30. Second wiring section 40 has a first end portion 44 and a second end portion 45. First end portion 44 and second end portion 45 are located at both ends of second wiring section 40.

A through hole 20*c* is formed in base film 20. Through hole 20*c* penetrates base film 20 along the thickness direction. Second end portion 35 is on first main surface 20*a* around through hole 20*c*. Second end portion 45 is on second main surface 20*b* around through hole 20*c*. Second end portion 35 and second end portion 45 are electrically connected by a conductor (not illustrated) on the inner wall surface of through hole 20*c*. Thus, first wiring section 30 and second wiring section 40 are electrically connected.

The length of first wiring section 30 is greater than or equal to 150 mm and less than or equal to 1000 mm. The length of first wiring section 30 refers to the length of first wiring section 30 between first end portion 34 and second end portion 35. The length of second wiring section 40 is greater than or equal to 150 mm and less than or equal to 1000 mm. The length of second wiring section 40 refers to the length of second wiring section 40 between first end portion 44 and second end portion 45.

The plurality of printed wiring boards 10 is disposed to be overlapped in the thickness direction of base film 20. Two printed wiring boards 10 adjacent to each other in the thickness direction of base film 20 are referred to as printed wiring board 10*a* and printed wiring board 10*b*, respectively. First main surface 20*a* of printed wiring board 10*a* faces second main surface 20*b* of printed wiring board 10*b*.

First end portion 34 of printed wiring board 10*a* and first end portion 44 of printed wiring board 10*b* are electrically connected to each other, whereby first conductive pattern 50 (first wiring section 30) of printed wiring board 10*a* and second conductive pattern 60 (second wiring section 40) of printed wiring board 10*b* are electrically connected to each other. Two outermost printed wiring boards 10 in the thickness direction of base film 20 are referred to as printed wiring board 10*c* and printed wiring board 10*d*, respectively. First end portion 34 of printed wiring board 10*c* and first end portion 44 of printed wiring board 10*d* serve as external connection terminals of coil device 100.

The sum of the length of first wiring section 30 and the length of second wiring section 40 for all printed wiring boards 10 included in coil device 100 is, for example, greater than or equal to 300 mm and less than or equal to 2000 mm.

Method for Manufacturing Printed Wiring Board 10

A method for manufacturing printed wiring board 10 will be described.

Figure 5:
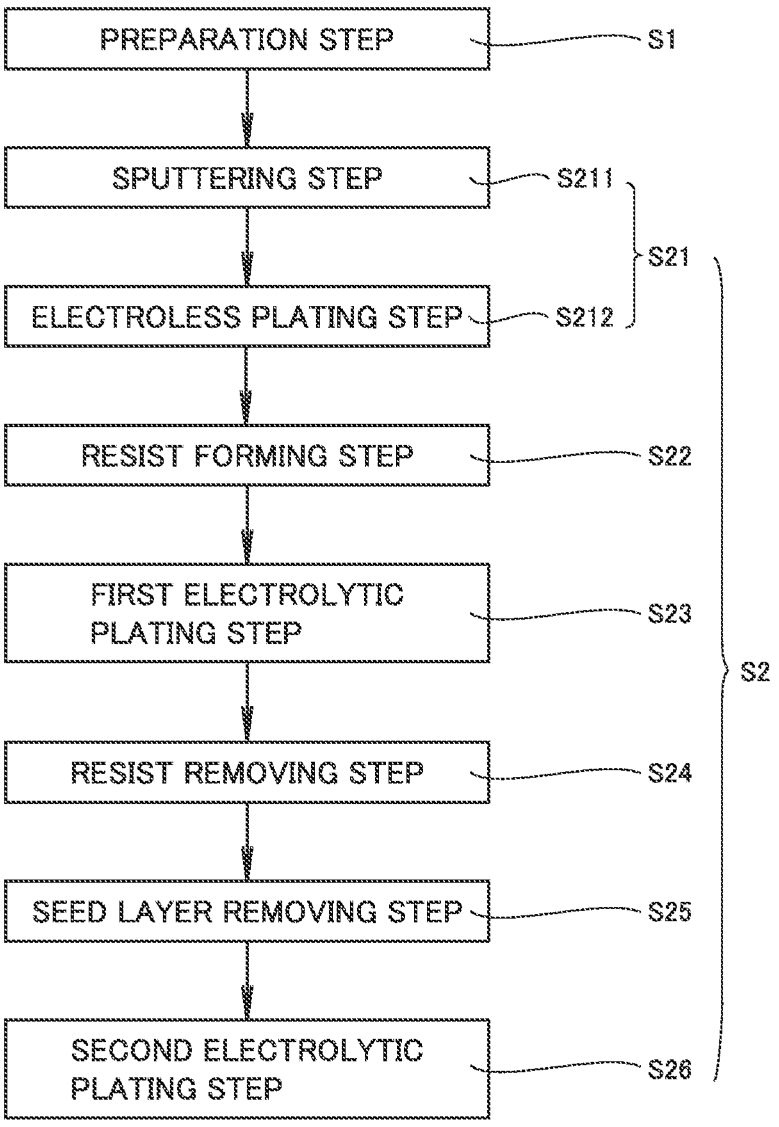
FIG. 5 is a process diagram illustrating a method for manufacturing printed wiring board 10.

FIG. 5 is a process diagram illustrating a method for manufacturing printed wiring board 10. As illustrated in FIG. 5, the method for manufacturing printed wiring board 10 includes a preparation step S1 and a conductive pattern forming step S2. The conductive pattern forming step S2 is performed after the preparation step S1.

In preparation step S1, base film 20 is prepared. First wiring section 30 is not formed on first main surface 20*a* of base film 20 prepared in preparation step S1, and second wiring section 40 is not formed on second main surface 20*b* of base film 20 prepared in preparation step S1. Note that base film 20 prepared in preparation step S1 is not diced. That is, the plurality of printed wiring boards 10 is simultaneously formed by performing conductive pattern forming step S2.

Conductive pattern forming step S2 is performed using, for example, a semi-additive process. Conductive pattern forming step S2 includes a seed layer forming step S21, a resist forming step S22, a first electrolytic plating step S23, a resist removing step S24, a seed layer removing step S25, and a second electrolytic plating step S26. Resist forming step S22 is performed after seed layer forming step S21. First electrolytic plating step S23 is performed after resist forming step S22. Resist removing step S24 is performed after first electrolytic plating step S23. Seed layer removing step S25 is performed after resist removing step S24. Second electrolytic plating step S26 is performed after seed layer removing step S25.

In seed layer forming step S21, seed layer 31 and seed layer 41 are formed. Seed layer forming step S21 includes sputtering step S211 and electroless plating step S212. Electroless plating step S212 is performed after sputtering step S211.

Figure 6:
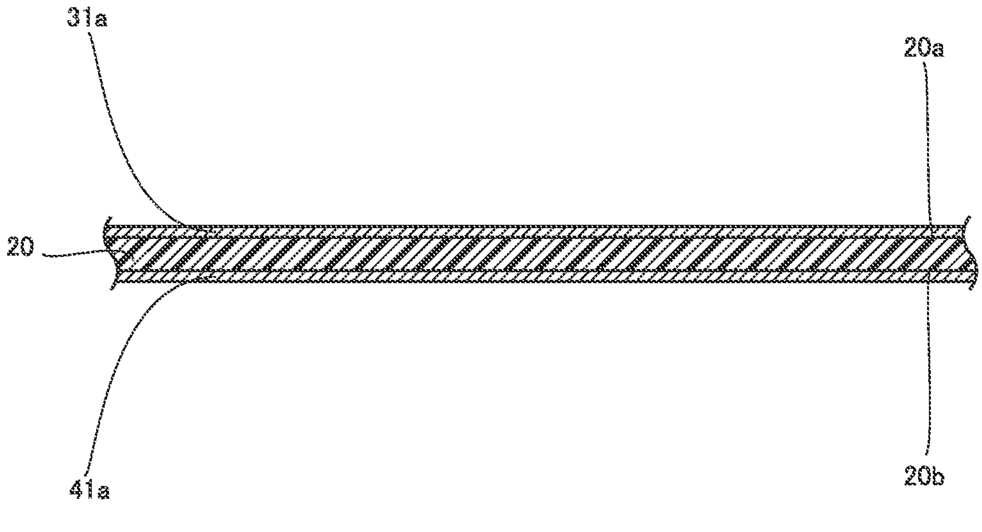
FIG. 6 is a cross-sectional view of a base film 20 after a sputtering step S211.
Figure 7:
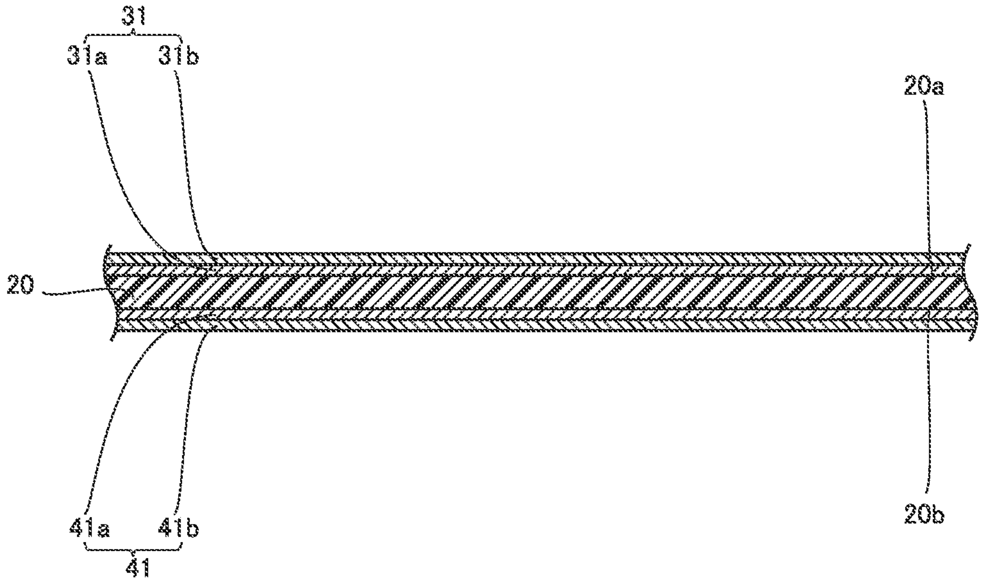
FIG. 7 is a cross-sectional view of base film 20 in an electroless plating step S212.

FIG. 6 is a cross-sectional view of base film 20 after sputtering step S211. As shown in FIG. 6, sputtering is performed in sputtering step S211, by which first layer 31*a* is formed on first main surface 20*a*, and first layer 41*a* is formed on second main surface 20*b*. FIG. 7 is a cross-sectional view of base film 20 in electroless plating step S212. As shown in FIG. 7, electroless plating is performed in electroless plating step S212 and, thereby, second layer 31*b* is formed on first layer 31*a*, and second layer 41*b* is formed on first layer 41*a*.

Figure 8:
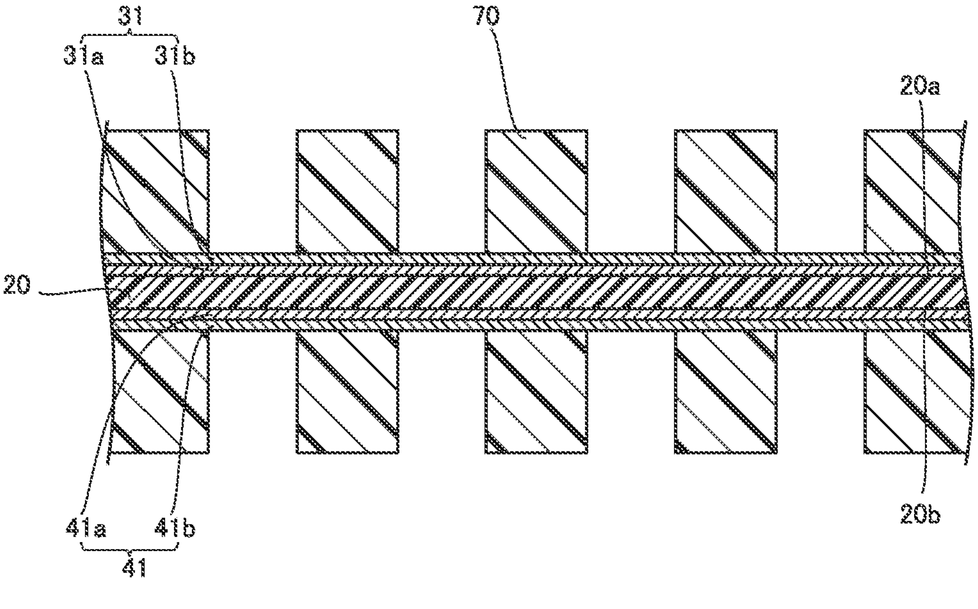
FIG. 8 is a cross-sectional view of base film 20 after a resist forming step S22.

FIG. 8 is a cross-sectional view of base film 20 after resist forming step S22. As illustrated in FIG. 8, a resist 70 is formed in resist forming step S22. Resist 70 is formed on seed layer 31 and seed layer 41. Resist 70 is formed by applying a photosensitive organic material on seed layer 31 and seed layer 41 and patterning the applied photosensitive organic material by exposure and development. Seed layer 31 and seed layer 41 are partially exposed from an opening of resist 70.

Figure 9:
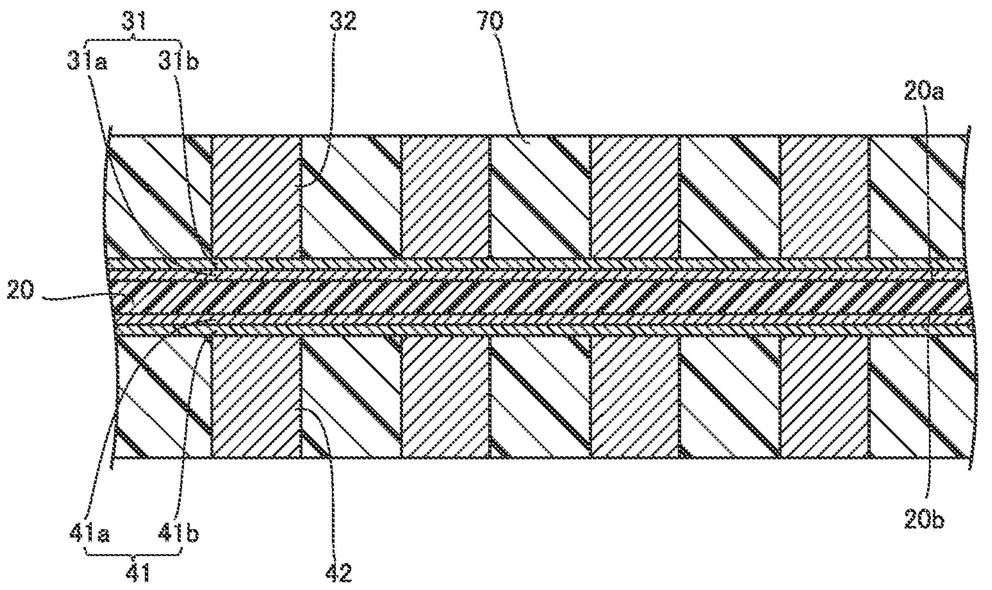
FIG. 9 is a cross-sectional view of base film 20 after a first electrolytic plating step S23.

FIG. 9 is a cross-sectional view of base film 20 after first electrolytic plating step S23. As shown in FIG. 9, first electrolytic plating layer 32 and first electrolytic plating layer 42 are formed in first electrolytic plating step S23. First electrolytic plating layer 32 is formed on seed layer 31 exposed from resist 70 by performing electrolytic plating by applying a current to seed layer 31 in a state where base film 20 is placed in a plating solution. First electrolytic plating layer 42 is formed on seed layer 41 exposed from resist 70 by performing electrolytic plating by applying a current to seed layer 41 in a state where base film 20 is placed in a plating solution.

Figure 10:
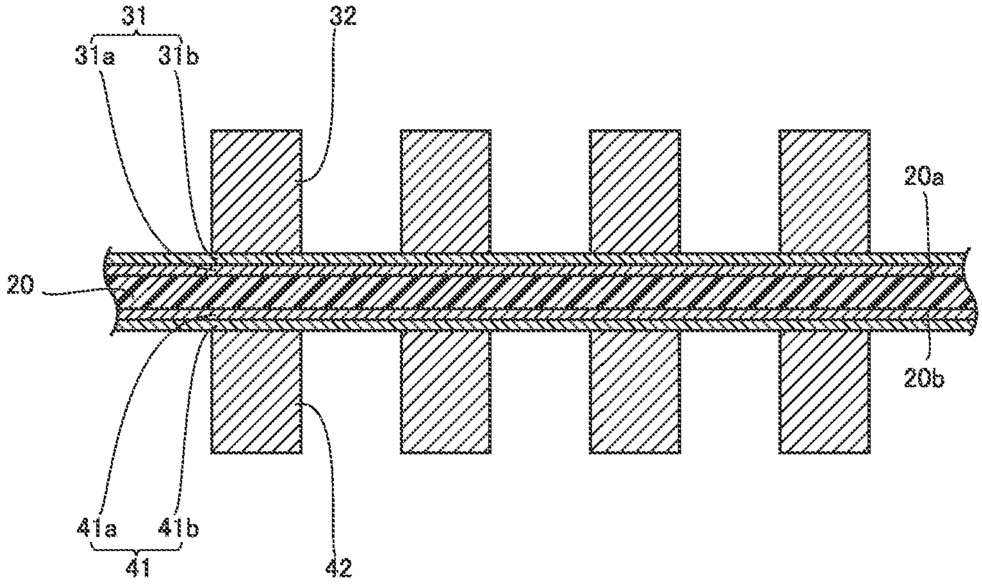
FIG. 10 is a cross-sectional view of base film 20 after a resist removing step S24.

FIG. 10 is a cross-sectional view of base film 20 after resist removing step S24. As illustrated in FIG. 10, in resist removing step S24, resist 70 is peeled off and removed from seed layer 31 and seed layer 41. As a result, seed layer 31 is exposed between adjacent first electrolytic plating layers 32, and seed layer 41 is exposed between adjacent first electrolytic plating layers 42.

Figure 11:
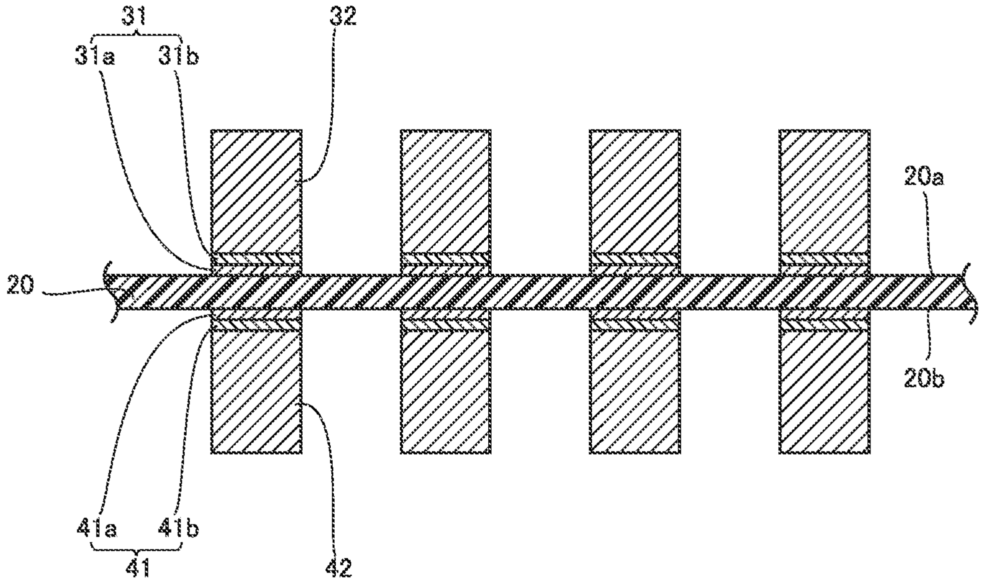
FIG. 11 is a cross-sectional view of base film 20 after a seed layer removing step S25.

FIG. 11 is a cross-sectional view of base film 20 after seed layer removing step S25. As shown in FIG. 11, in seed layer removing step S25, seed layer 31 exposed between adjacent first electrolytic plating layers 32 and seed layer 41 exposed between adjacent first electrolytic plating layers 42 are removed by etching.

Etching is performed by supplying an etching solution between adjacent first electrolytic plating layers 32 and between adjacent first electrolytic plating layers 42. The etching solution is selected such that the rate of etching is controlled not by diffusion of reactive species in the etching solution to the vicinity of a target to be etched but by reaction between reactive species in the etching solution and the target to be etched.

More specifically, an etching solution which has a dissolution reaction rate of less than or equal to 1.0 μm/min with respect to the materials (that is, copper) constituting second layer 31*b* and second layer 41*b* is selected as the etching solution. Specific examples of such an etching solution include a sulfuric acid/hydrogen peroxide solution and an aqueous solution of sodium peroxodisulfate. The dissolution reaction rate of the etching solution used in seed layer removing step S25 with respect to the materials constituting second layer 31*b* and second layer 41*b* is measured on the basis of the weight of copper reduced after etching and the etching time.

After the etching of second layer 31*b* and second layer 41*b* is completed, the etching solution is switched. An etching solution having a high selection ratio with respect to the materials (that is, nickel-chromium alloy) constituting first layer 31*a* and first layer 41*a* is used as the switched etching solution. Therefore, after the switching of the etching solution, etching on first electrolytic plating layer 32 and first electrolytic plating layer 42 hardly proceeds.

In second electrolytic plating step S26, second electrolytic plating layer 33 and second electrolytic plating layer 43 are formed. Second electrolytic plating layer 33 is formed so as to cover seed layer 31 and first electrolytic plating layer 32 by performing electrolytic plating by applying a current to seed layer 31 and first electrolytic plating layer 32 in a state where base film 20 is placed in a plating solution. Second electrolytic plating layer 43 is formed so as to cover seed layer 41 and first electrolytic plating layer 42 by performing electrolytic plating by applying a current to seed layer 41 and first electrolytic plating layer 42 in a state where base film 20 is placed in a plating solution. After second electrolytic plating step S26 is performed, base film 20 is diced and, thus, a plurality of printed wiring boards 10 having the structure shown in FIGS. 2 to 4 is formed.

(Effect of Coil Device According to Embodiment)

An effect of coil device 100 will be described.

In order to downsize the coil while increasing the number of turns (the length of the wiring section) of the wiring section constituting the coil, it is necessary to improve the pattern density of the wiring section constituting the coil, that is, to decrease the distance between the adjacent wiring sections. Conventionally, when the distance between the adjacent wiring sections is intended to be decreased, there is a problem that the wiring sections are excessively etched, and the electric resistance of the coil increases (that is, the length of the wiring section constituting the coil has to be decreased).

In addition, the electrical resistance of the wiring section can be reduced by increasing the height of the wiring section. However, conventionally, when the height of the wiring section is to be increased, the wiring section is excessively etched, and thus the length of the wiring section has to be decreased in order to reduce the electric resistance of the wiring section. The electric resistance of the wiring section can also be reduced by increasing the width of the wiring section, but in this case, the size of the coil increases.

Conventionally, an etching solution (that is, an etching solution in which the diffusion of the reactive species in the etching solution to the vicinity of a target to be etched controls the etching rate) having a high dissolution reaction rate with respect to a material constituting a seed layer has been used. When the distance between the adjacent wiring sections is decreased or the height of the wiring sections is increased, the etching solution is less likely to be supplied between the adjacent wiring sections. As a result, when the etching solution as described above is used, a variation in etching with respect to the seed layer increases, and an etching amount increases in order to reliably remove the seed layer. For the reasons described above, it has been conventionally not possible to increase the number of turns (the length of the wiring section) of the wiring section and to increase the height of the wiring section by decreasing the distance between the adjacent wiring sections.

Coil device 100 includes printed wiring board 10. In seed layer removing step S25, an etching solution having a low dissolution reaction rate with respect to the materials constituting second layer 31*b* and second layer 41*b* is used for printed wiring board 10. As a result, the rate of etching performed in seed layer removing step S25 is controlled by the reaction between the reactive species in the etching solution and the target to be etched. Therefore, even if the etching solution is less likely to be supplied between adjacent first electrolytic plating layers 32 and between adjacent first electrolytic plating layers 42, variations in the etching of seed layer 31 (second layer 31*b*) and seed layer 41 (second layer 41*b*) are less likely to occur.

Therefore, according to coil device 100, it is possible to prevent first electrolytic plating layer 32 and first electrolytic plating layer 42 from being excessively etched, and thus, the pattern density of first wiring section 30 and second wiring section 40 can be improved. Further, according to coil device 100, an increase in resistance of first wiring section 30 and second wiring section 40 can be suppressed due to an increase in heights of first wiring section 30 and second wiring section 40, and thus, it is possible to ensure the lengths of first wiring section 30 and second wiring section 40.

In coil device 100, the pattern density of first wiring section 30 and second wiring section 40 is improved, with the result that first conductive pattern 50 and second conductive pattern 60 can be downsized with the lengths of first wiring section 30 and second wiring section 40 being ensured (more specifically, width $W_{C1}$ and length $L_{C1}$ can be set to be less than or equal to 10 mm and less than or equal to 15 mm, respectively, and width $W_{C2}$ and length $L_{C2}$ can be set to be less than or equal to 10 mm and less than or equal to 15 mm, respectively).

In coil device 100, when the value obtained by dividing height H1 by width W1 (the value obtained by dividing height H2 by width W2) is greater than or equal to 0.15 and less than or equal to 5, the aspect ratio of first wiring section 30 (second wiring section 40) increases. Therefore, the electric resistance of first wiring section 30 (second wiring section 40) can be further reduced while improving the pattern density of the adjacent first wiring section 30 (second wiring section 40).

In coil device 100, when the value obtained by dividing height H1 by distance DIS1 (the value obtained by dividing height H2 by distance DIS2) is greater than or equal to 2 and less than or equal to 25, the electric resistance of first wiring section 30 (second wiring section 40) can be further reduced while improving the pattern density of the adjacent first wiring section 30 (second wiring section 40).

Examples

In order to confirm the effect of coil device 100, Samples 1 to 11 were prepared as samples of coil device 100. Samples 1 to 11 were prepared by changing the etching solution used in seed layer removing step S25, width $W_{c1}$, length $L_{c1}$, the length of first wiring section 30, the length of second wiring section 40, the sum of the length of first wiring section 30 and the length of second wiring section 40, width W1, distance DIS1, height H1, and the sum of the number of turns of first wiring section 30 and the number of turns of second wiring section 40 as shown in Table 1. As width $W_{c2}$, length $L_{c2}$, width W2, distance DIS2, and height H2 are equal to width $W_{c1}$, length $L_{c1}$, width W1, distance DIS1, and height H1, respectively, they are not illustrated in Table 1. Note that "A" in the column of etching solution in Table 1 indicates that an aqueous solution of sodium peroxodisulfate having a dissolution rate of 0.8 μm/min was used. In addition, "B" in the column of etching solution in Table 1 indicates that an aqueous solution of iron chloride having a dissolution rate of 1.5 μm/min was used.

TABLE 1

| | Etching solution | Width $W_{c1}$ (mm) | Length $L_{c1}$ (mm) | Length of wiring section (mm): First wiring section 30 | Length of wiring section (mm): Second wiring section 40 | Length of wiring section (mm): Sum | Width W1 (μm): Design value | Width W1 (μm): Actual measurement value | Distance DIS1 (μm): Design value | Distance DIS1 (μm): Actual measurement value |
|---|---|---|---|---|---|---|---|---|---|---|
| Sample 1 | A | 4 | 9 | 150 | 150 | 300 | 10 | 10.5 | 8 | 7.5 |
| Sample 2 | A | 5 | 10 | 900 | 900 | 1800 | 25 | 26 | 5 | 4 |
| Sample 3 | A | 8 | 12 | 900 | 900 | 1800 | 25 | 25 | 15 | 15 |
| Sample 4 | A | 4 | 8 | 900 | 900 | 1800 | 20 | 21 | 5 | 4 |
| Sample 5 | B | 4 | 6 | 75 | 75 | 150 | 10 | 14 | 8 | 4 |
| Sample 6 | B | 4 | 9 | 150 | 150 | 300 | 10 | 16.5 | 8 | 1.5 |
| Sample 7 | B | 8 | 12 | 900 | 900 | 1800 | 25 | 39 | 15 | 1 |
| Sample 8 | B | 12 | 18 | 900 | 900 | 1800 | 25 | 35 | 30 | 20 |
| Sample 9 | A | 4 | 8 | 900 | 900 | 1800 | 20 | 21 | 3 | 2 |
| Sample 10 | A | 12 | 18 | 900 | 900 | 1800 | 25 | 25 | 30 | 30 |
| Sample 11 | A | 10 | 15 | 1200 | 1200 | 2400 | 25 | 26 | 5 | 4 |

| | Height H1 (μm) | Height H1/ Width W1 | Height H1/ Distance DIS1 | Number of turns | Resistance value (Ω) | Short-circuit failure |
|---|---|---|---|---|---|---|
| Sample 1 | 40 | 3.8 | 5.3 | 12 | 12.6 | Not observed |
| Sample 2 | 50 | 1.9 | 12.5 | 50 | 24.2 | Not observed |
| Sample 3 | 50 | 2.0 | 3.3 | 46 | 24.2 | Not observed |
| Sample 4 | 75 | 3.6 | 18.8 | 50 | 20.2 | Not observed |
| Sample 5 | 40 | 2.9 | 10.0 | 6 | 6.3 | Not observed |
| Sample 6 | 40 | 2.4 | 26.7 | 12 | 12.6 | Observed |
| Sample 7 | 50 | 1.3 | 50.0 | 46 | 24.2 | Observed |
| Sample 8 | 50 | 1.4 | 2.5 | 46 | 24.2 | Not observed |
| Sample 9 | 75 | 3.6 | 37.5 | 52 | 20.2 | Observed |
| Sample 10 | 50 | 2.0 | 1.7 | 46 | 24.2 | Not observed |
| Sample 11 | 50 | 1.9 | 12.5 | 58 | 32.2 | Not observed |

Sample 1 and Sample 6 had the same design except that the etching solution was different. Sample 3 and Sample 7 had the same design except that the etching solution was different. In Samples 1 and 3, the difference between the design value of distance DIS1 (distance DIS2) and the actual measurement value of distance DIS1 (distance DIS2) was small. On the other hand, in Sample 6 and Sample 7, the difference between the design value of distance DIS1 (distance DIS2) and the actual measurement value of distance DIS1 (distance DIS2) was large, and a short-circuit failure occurred. From this comparison, it has been revealed that, by using an etching solution having a dissolution rate of 1.0 μm/min in seed layer removing step S25, variations in etching for the seed layer (seed layer 31, seed layer 41) are suppressed, and coil device 100 can be manufactured even if distance DIS1 (distance DIS2) is small.

In Samples 2 to 4, Sample 8, Sample 9, and Sample 10, the length of first wiring section 30 and the length of second wiring section 40 were 900 mm, and the sum of the length of first wiring section 30 and the length of second wiring section 40 was 1800 mm. In Samples 2 to 4, distance DIS1 (distance DIS2) was greater than or equal to 3 μm and less than or equal to 15 μm. In Samples 8 and 10, distance DIS1 (distance DIS2) exceeded 15 μm. In Sample 9, distance DIS1 (distance DIS2) was less than 3 μm.

In each of Samples 2 to 4, width $W_{c1}$ (width $W_{c2}$) and length $L_{c1}$ (length $L_{c2}$) were less than or equal to 10 mm and less than or equal to 15 mm, respectively. In each of Samples 8 and 10, width $W_{c1}$ (width $W_{c2}$) and length $L_{c1}$ (length $L_{c2}$) exceeded 10 mm and 15 mm, respectively. No short-circuit failure occurred in Samples 2 to 4. In Sample 9, a short-circuit failure occurred. From this comparison, it has been revealed that, by setting distance DIS1 (distance DIS2) to be greater than or equal to 3 μm and less than or equal to 15 μm, coil device 100 in which the coil is downsized while increasing the number of turns of the wiring section constituting the coil can be manufactured.

In Samples 1 to 5, distance DIS1 (distance DIS2) was greater than or equal to 3 μm and less than or equal to 15 μm. In each of Samples 1 to 5, width $W_{c1}$ (width $W_{c2}$) and length $L_{c1}$ (length $L_{c2}$) were less than or equal to 10 mm and less than or equal to 15 mm, respectively.

In Samples 1 to 4, the length of first wiring section 30 and the length of second wiring section 40 were greater than or equal to 150 mm, and the sum of the length of first wiring section 30 and the length of second wiring section 40 was greater than or equal to 300 mm. On the other hand, in Sample 5, the length of first wiring section 30 and the length of second wiring section 40 were less than 150 mm, and the sum of the length of first wiring section 30 and the length of second wiring section 40 was less than 300 mm. In Samples 1 to 4, the sum of the number of turns of first wiring section 30 and the number of turns of second wiring section 40 was greater than or equal to 10, and in Sample 5, the sum of the number of turns of first wiring section 30 and the number of turns of second wiring section 40 was less than 10. From this comparison, it has been revealed that, by setting the length of first wiring section 30 and the length of second wiring section 40 to be greater than or equal to 150 mm and setting the sum of the length of first wiring section 30 and the length of second wiring section 40 to be greater than or equal to 300 mm, the coil can be downsized while increasing the number of turns of the wiring section constituting the coil.

In Samples 1 to 4 and Sample 11, distance DIS1 (distance DIS2) was greater than or equal to 3 μm and less than or equal to 15 μm. In each of Samples 1 to 4 and Sample 11, width $W_{c1}$ (width $W_{c2}$) and length $L_{c1}$ (length $L_{c2}$) were less than or equal to 10 mm and less than or equal to 15 mm, respectively.

In Samples 1 to 4, the length of first wiring section 30 and the length of second wiring section 40 were less than or equal to 1000 mm, and the sum of the length of first wiring section 30 and the length of second wiring section 40 was less than or equal to 2000 mm. On the other hand, in Sample 11, the length of first wiring section 30 and the length of second wiring section 40 exceeded 1000 mm, and the sum of the length of first wiring section 30 and the length of second wiring section 40 exceeded 2000 mm. Samples 1 to 4 had an electric resistance value of less than or equal to 30Ω, and Sample 11 had an electric resistance value exceeding 30Ω. From this comparison, it has been revealed that the electric resistance value of coil device 100 can be reduced by setting the length of first wiring section 30 and the length of second wiring section 40 to be less than or equal to 1000 mm and setting the sum of the length of first wiring section 30 and the length of second wiring section 40 to be less than or equal to 2000 mm.

It should be understood that the embodiment disclosed herein is illustrative in all respects and not restrictive. The scope of the present invention is defined not by the embodiment but by the claims, and is intended to include meanings equivalent to the claims and all modifications within the scope.

REFERENCE SIGNS LIST

100: coil device, 10, 10*a*, 10*b*, 10*c*, 10*d*: printed wiring board, 20: base film, 20*a*: first main surface, 20*b*: second main surface, 20*c*: through hole, 30: first wiring section, 31: seed layer, 31*a*: first layer, 31*b*: second layer, 32: first electrolytic plating layer, 33: second electrolytic plating layer, 34: first end portion, 35: second end portion, 40: second wiring section, 41: seed layer, 41*a*: first layer, 41*b*: second layer, 42: first electrolytic plating layer, 43: second electrolytic plating layer, 44: first end portion, 45: second end portion, 50: first conductive pattern, 60: second conductive pattern, 70: resist, S1: preparation step, S2: conductive pattern forming step, S21: seed layer forming step, S22: resist forming step, S23: first electrolytic plating step, S24: resist removing step, S25: seed layer removing step, S26: second electrolytic plating step, S211: sputtering step, S212: electroless plating step, DIS1, DIS2: distance, H1, H2: height, $L_{C1}$, $L_{C2}$: length, W1, W2, $W_{C1}$, $W_{C2}$: width

The invention claimed is:

1. A coil device comprising at least one printed wiring board, the at least one printed wiring board including: a base film that includes a first main surface and a second main surface; and a first conductive pattern constituted by a first wiring section spirally wound on the first main surface, wherein an average distance between the first wiring sections adjacent to each other is greater than or equal to 3 μm and less than or equal to 15 μm, the first wiring section has a first end, a second end and a length extending from the first end to the second end, the length being greater than or equal to 150 mm and less than or equal to 1000 mm, the first wiring section includes a seed layer disposed on the first main surface, a first electrolytic plating layer disposed on the seed layer, and a second electrolytic plating layer covering the seed layer and the first electrolytic plating layer, and in plan view, the first conductive pattern has a width less than or equal to 10 mm and a length less than or equal to 15 mm.

2. The coil device according to claim 1, wherein the at least one printed wiring board further includes a second conductive pattern constituted by a second wiring section spirally wound on the second main surface, and the second wiring section has a length greater than or equal to 150 mm and less than or equal to 1000 mm.

3. The coil device according to claim 1, wherein the seed layer includes a sputtered layer disposed on the first main surface and an electroless plating layer disposed on the sputtered layer, the sputtered layer is formed of a material different from a material of the first electrolytic plating layer, and the electroless plating layer is formed of a material same as the material of the first electrolytic plating layer.

4. The coil device according to claim 1, wherein the seed layer is a single layer formed of a material same as the material of the first electrolytic plating layer.

5. The coil device according to claim 4, wherein the single layer is a sputtered layer.

6. The coil device according to claim 1, wherein a value obtained by dividing a height of the first wiring section by a width of the first wiring section is greater than or equal to 0.15 and less than or equal to 5.

7. The coil device according to claim 1, wherein a value obtained by dividing a height of the first wiring section by an average distance between the first wiring sections adjacent to each other is greater than or equal to 2 and less than or equal to 25.

8. The coil device according to claim 1, wherein the at least one printed wiring board includes a plurality of printed wiring boards disposed to be overlapped in a thickness direction of the base film.

9. The coil device according to claim 8, wherein at least one of the plurality of printed wiring boards further includes a second conductive pattern constituted by a second wiring section spirally wound on the second main surface, and the second wiring section has a length greater than or equal to 150 mm and less than or equal to 1000 mm.

10. The coil device according to claim 1, wherein the at least one printed wiring board includes a plurality of printed wiring boards disposed to be overlapped in a thickness direction of the base film, each of the plurality of printed wiring boards further includes a second conductive pattern constituted by a second wiring section that is wound on the second main surface and that is electrically connected to the first wiring section, an average distance between the second wiring sections adjacent to each other is greater than or equal to 3 μm and less than or equal to 15 μm, the first wiring section of a first printed wiring board that is one of the plurality of printed wiring boards is electrically connected to the second wiring section of a second printed wiring board that is another one of the plurality of printed wiring boards adjacent to the first printed wiring board in the thickness direction of the base film, and a sum of the length of the first wiring section and the length of the second wiring section in the plurality of printed wiring boards is greater than or equal to 300 mm and less than or equal to 2000 mm.

11. A coil device comprising a plurality of printed wiring boards, wherein each of the plurality of printed wiring boards includes; a base film that has a first main surface and a second main surface; a first conductive pattern that is constituted by a first wiring section wound on the first main surface; and a second conductive pattern that is constituted by a second wiring section spirally wound on the second main surface and electrically connected to the first wiring section, the plurality of printed wiring boards is disposed to be overlapped in a thickness direction of the base film, the first wiring section of a first printed wiring board that is one of the plurality of printed wiring boards is electrically connected to the second wiring section of another, second one of the plurality of printed wiring boards adjacent to the first printed wiring board in the thickness direction of the base film, an average distance between the first wiring sections adjacent to each other and an average distance between the second wiring sections adjacent to each other are greater than or equal to 3 μm and less than or equal to 15 μm, the first wiring section has a first end, a second end and a first length extending from the first end to the second end, the second wiring section has a third end, a fourth end and a second length extending from the third end to the fourth end, a sum of the first length and the second length in the plurality of printed wiring boards is greater than or equal to 300 mm and less than or equal to 2000 mm, the first wiring section includes a seed layer disposed on the first main surface, a first electrolytic plating layer disposed on the seed layer, and a second electrolytic plating layer covering the seed layer and the first electrolytic plating layer, and in plan view, the first conductive pattern has a width less than or equal to 10 mm and a length less than or equal to 15 mm.

* * * * *